United States Patent
Geise

Patent Number: 5,858,043
Date of Patent: Jan. 12, 1999

[54] VIRTUAL IMPACTORS WITH SLIT SHAPED NOZZLES WITHOUT SLIT ENDS

[75] Inventor: Hans-Ulrich Geise, Ohz-Scharmb, Germany

[73] Assignee: Bruker-Franzen Analytik, GmbH, Bremen, Germany

[21] Appl. No.: 977,982

[22] Filed: Nov. 25, 1997

Related U.S. Application Data

[63] Continuation of Ser. No. 598,344, Feb. 8, 1996, abandoned.

[30] Foreign Application Priority Data

Feb. 9, 1995 [DE] Germany ............... 195 04 275.1

[51] Int. Cl.$^6$ .................................................. B01D 45/08
[52] U.S. Cl. .................................................. 55/462; 95/32
[58] Field of Search .................. 55/462, 464; 95/32, 95/33; 209/143, 145

[56] References Cited

U.S. PATENT DOCUMENTS 3,616,596  11/1971  Campargue ................................ 95/32
5,425,802   6/1995  Burton et al. ......................... 55/462 X

FOREIGN PATENT DOCUMENTS 924284   7/1947  France ................................... 55/462
2288753  11/1995  United Kingdom.

*Primary Examiner*—Richard L. Chiesa

[57] ABSTRACT

The invention relates to virtual impactors with slit-shaped nozzles. Virtual impactors serve to enrich aerosol particles of certain magnitudes from gases, particularly from ambient air, for the purpose of examining these particles. For very strong enrichments, reaching up to many hundreds of times the initial concentration, very effective multi-stage virtual impactors with hundreds of nozzles have been developed. However, these are difficult to manufacture and to clean. The individual nozzles can be replaced by slits which are easier to manufacture. With slit-shaped nozzles problems with instability at the ends of the slits occur. The invention describes slit-shaped nozzles, the slits of which have no ends because they are designed as curved, closed figures. By contrast with the prior art which relates to circular slits in parallel plates, here any closed figures are represented, including ones which are not in plane-parallel plates.

6 Claims, 3 Drawing Sheets

VIRTUAL IMPACTORS WITH SLIT SHAPED NOZZLES WITHOUT SLIT ENDS

This application is a continuation of application Ser. No. 08/598,344 filed Feb. 8, 1996, now abandoned.

The invention relates to virtual impactors with slit-shaped nozzles.

Virtual impactors serve to enrich aerosol particles of certain size ranges from gases, particularly from ambient air, for the purpose of examining these particles. For strong enrichments, hundredfolds of the initial concentration, very effective multistage virtual impactors with hundreds of nozzles have been developed. However, these are difficult to manufacture and to clean. The individual nozzles can be replaced by slits which are easier to manufacture. With slit-shaped nozzles problems with instability at the ends of the slits occur.

The invention describes slit-shaped nozzles, the slits of which have no ends because they are designed as curved, closed figures. By contrast with the application DE 44 15 014.8, which relates to circular slits in parallel plates, here any closed figures are represented, including ones which are not in plane-parallel plates.

PRIOR ART

Patent application DE 44 15 014 of the same patentee presents the prior art, as described in literature and current patents. Also disadvantages of the prior art are discussed there. This patent description should be regarded as included here in full. Emphasis here is given to the disadvantages of the prior art, as given in the above patent application.

The above patent application proposes a design of a virtual impactor with slits which take the form of closed circular loops in two parallel plates in order to eliminate the problems occurring at the ends of slits. The limitation to circles in parallel plates seemed to be advisable due to the easy and inexpensive producibility of the parts on usual lathes.

However, the limitation to circular slits in plane-parallel plates also shows some disadvantages.

For the air flow of one cubic meter per minute a slit length of 40 to 50 centimeters is required if particles larger than about 2 micrometers are to be enriched. The length of the slit increases in proportion to air flow; consequently, for more powerful impactors longer slits are required. If the range of enrichment is to be extended toward smaller particles, the length of slit increases approximately reciprocally with the third power of the gas dynamic diameter of the particles. For the resulting very long slits the circular shape is unfavorable. The arrangement of a number of adjacent circular slits is not particularly advantageous either.

On the other hand digital control of milling machines and other sheet-metal forming devices makes it very easy to produce any shape of slit with high precision and at low cost.

Circular slit nozzles in plane-parallel plates with a conical impactor chamber, as described in the above patent application, are bound to blow the particles at the conical wall. For this reason a complex design of wall scavenging system by additional air flows is required to prevent the particles being deposited.

OBJECTIVE OF THE INVENTION

An arrangement for virtual impactors with slit-shaped nozzles has to be found which is, also for long slits, space-saving, precise, and producible at low cost. An arrangement which can do without a wall scavenging gas system in the impactor chamber is particularly favorable. Furthermore, it must be possible to open the virtual impactor easily for cleaning purposes and thereby provide good accessibility to the parts which easily become polluted.

BRIEF DESCRIPTION OF THE INVENTION

It is the basic idea of the invention to curve slit-shaped nozzles and to design them as a closed figure because then no problems with the ends of the slits occur. But different from patent application DE 44 15 014, the figures can be of any shape, for example closed wavy lines which have a longer length of slit than the circular slit-shaped nozzle so if the arrangement is of the same size, performance will be higher.

It is a further basic idea of the invention to position the slits not in plane-parallel plates but in non-planar shells of any shape. Since the generator nozzle forming the gas jet and the receptor nozzle receiving the particles must always be well centered opposite one another, the generator nozzles and receptor nozzles must both be arranged in two concentric shells.

Due to the easier producibility and adjustability these shells can be radially symmetric shells, i.e. concentric pairs of cylinder segments, cone segments, sphere segments, torus segments, or the like. If the generator nozzles are placed in the outside shell and the receptor nozzles in the inside shell, there is also the advantage that the particles, due to their acceleration in the gas jet, automatically move towards the axis inside the impactor chamber which is enclosed by the shell. The jet stream and the particles are thereby decelerated, and the particles easily move toward the exit ports in the bottom of the impactor chamber by the weak gas stream. If the shells and walls of the impactor chamber are favorably designed it is therefore possible to dispense with wall scavenging.

Due to their curvature in space the shells have good mechanical strength and a good resistance to vibrations, as is particularly important for virtual impactors. The shells can therefore be made of relatively thin material such as sheet metal or plastic; the virtual impactor can thus be relatively light Sheet metal shells of high strength, for example, can be made very easily and accurately by deep-drawing.

BRIEF PRESENTATION OF THE FIGURES

FIG. 1 shows a wavy, closed form of slit-shaped nozzle in a flush plate. The wavy shape (continuous line) serves to extend the slit length by comparison with the circular shape (dotted line), without increasing the diameter of the plate.

FIG. 2 shows a particularly favorable embodiment of the invention with concentric circular slit-shaped nozzles in a conical arrangement. The impactor chamber (5) dispenses with wall scavenging due to the conical arrangement of the entrance nozzle slits.

Legend for FIG. 2:

(1) Fresh air intake with aerosol particles (2) Accelerated air intake from the ring duct into the slit nozzle generating the air jet (3) Underpressure air stream generated by the suction pump, representing the part of the jet stream which was not accepted by the impactor chamber, forming the exhaust air stream (4) Small part (about 5%) of the air jet, accepted by the impactor chamber and enriched with particles, directed toward the axis of the impactor chamber (5) Inside of the impactor chamber (6) Second stage of the virtual impactor, here with separate round nozzles, operated by the restored pressure inside the impactor chamber (7) Suction pump for operating the virtual impactor (8) Small air stream enriched with particles, extracted with controlled flow (9) Depleted exhaust air.

FIG. 3 shows the principle of the same arrangement with the cover removed. The good accessibility for cleaning polluted parts is evident.

DETAILED DESCRIPTION OF THE PREFERRED EMBODIMENTS

Figure 2:
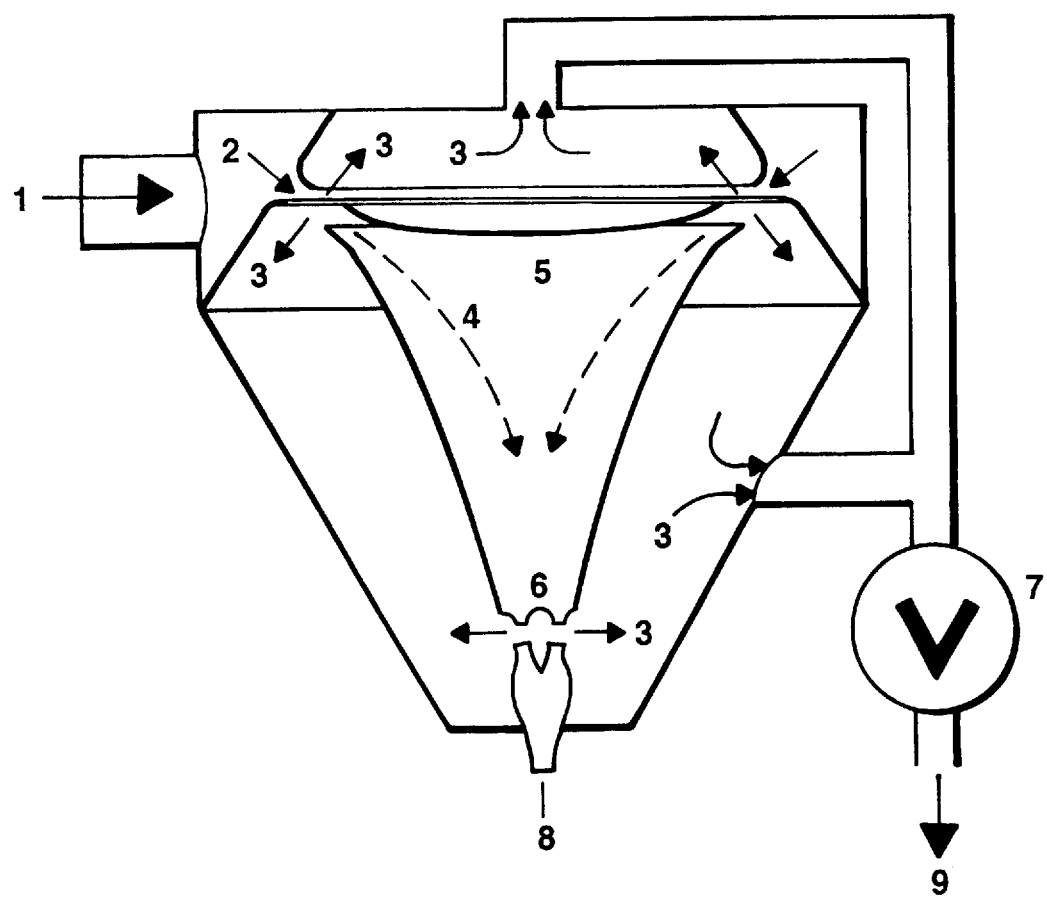
Figure 3:
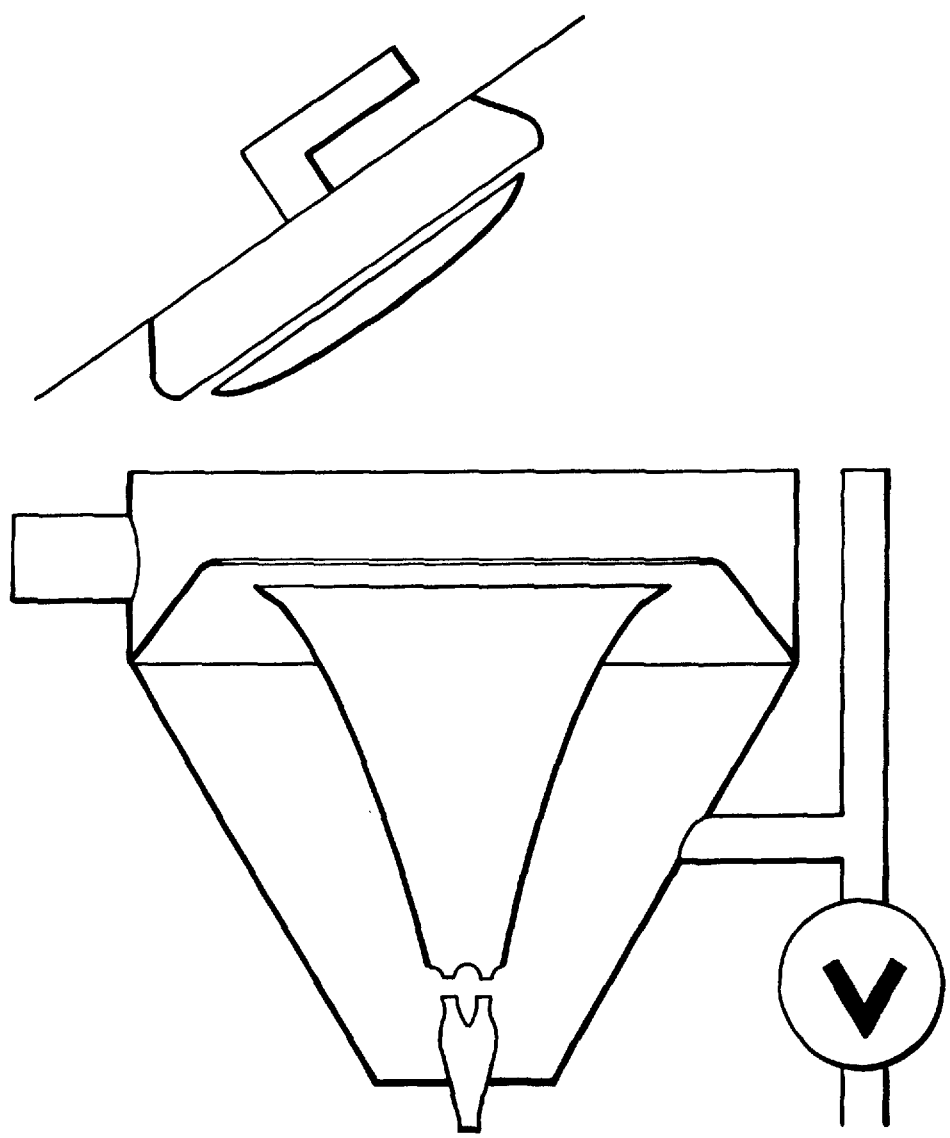

A preferred embodiment for collecting particles above a diameter of 2 micrometers from an air stream of 1 cubic meter per minute consists of an arrangement which is shown as a schematic diagram in FIGS. 2 and 3.

A suction pump (7) generates an underpressure of approximately 8 millibars below external atmospheric pressure throughout the virtual impactor, but outside the impactor chamber. This underpressure causes the suction of fresh air (1) with the aerosol particles into the impactor at a rate of about one cubic meter per minute. The fresh air initially enters a ring duct, the triangular cross section of which is visible. The fresh air in the ring duct then enters the circular generator slit nozzle as an air jet (2), whereby the air jet is considerably accelerated to velocities in the order of 100 kilometers per hour. The aerosol particles are also accelerated in the air jet. The overwhelming part of the particles and a small part (4) of the air jet stream enter the impactor chamber (5), which now contains air enriched with particles. Because the exit for the air is throttled, the main part of the stream of accelerated air (2) must reverse direction in front of and in the receptor slit nozzle due to the limited air being admitted into the impactor chamber. This main part of the air stream leaves the nozzle area in the form of an exit air stream (3) and is pumped away by the suction pump. The exit air leaves the virtual impactor as an exhaust stream (9).

The circular slits between the circular duct and the impactor chamber have a circumference of about 15 centimeters, i.e. a length of about 50 centimeters. The slits are located in two concentric cone segments, of which only the cone segment of the generator surface with the generator nozzle is in evidence as a cone segment surface. The receptor-end cone segment surface is not wider than the slit width of the receptor nozzle. The generator slit nozzle has a width of about 1 millimeter whilst the receptor slit nozzle is 1.4 millimeters wide. The distance between the slit edges is 1.8 millimeters (for reasons of clarity FIG. 2 is not drawn to scale). The slits must be adjusted centrally in regard to one another with an accuracy of 0.1 millimeter. This results in a cutoff threshold of about 2 micrometers for the aerodynamic diameter of particles with normal density.

Inside the impactor chamber the external atmospheric pressure is almost restored by the deceleration of the jet streams. The part of the air jet stream enriched with particles (4) in the impactor chamber (5) is fed to a second virtual impactor stage (6), operated by the difference between this restored pressure and the underpressure generated by the suction pump. This second stage consists of 19 nozzles with a diameter of 1.1 millimeter in the generator plate. For reasons of clarity, FIG. 2 only shows two of the nozzles. The larger part of the accelerated air must in turn escape from the space between the nozzles as exhaust air (3) because the air stream enriched with particles (8) again is limited. The small air stream (8) can then be fed for use via a small second suction pump (not shown in FIG. 2) regulating the air stream. If necessary, the air stream can be reduced again in a third stage with only one nozzle.

This arrangement can be designed in such a way that when the cover is removed the entire particle slit is opened, as indicated in the schematic diagram in FIG. 3. For reasons of greater clarity, schematic diagrams 1 and 2 do not show how the cover and the wall of the impactor chamber are attached to the outer walls of the impactor. It is a simple task for any design engineer to design such holders.

When opened, the ring duct, slit area, and impactor chamber can easily be cleaned. It is easily possible to provide a second access at the second impactor stage.

According to the invention it is also possible to use two concentric cylinders as the generator and receptor surfaces. The nozzle slits can very easily be placed along a circumferential line. Several parallel slit nozzles can be fitted one above the other. However, slit-shaped nozzles along the circumference of the cylinder can also be given a wavy shape in order to achieve a greater length of slits in a compact design.

Figure 1:
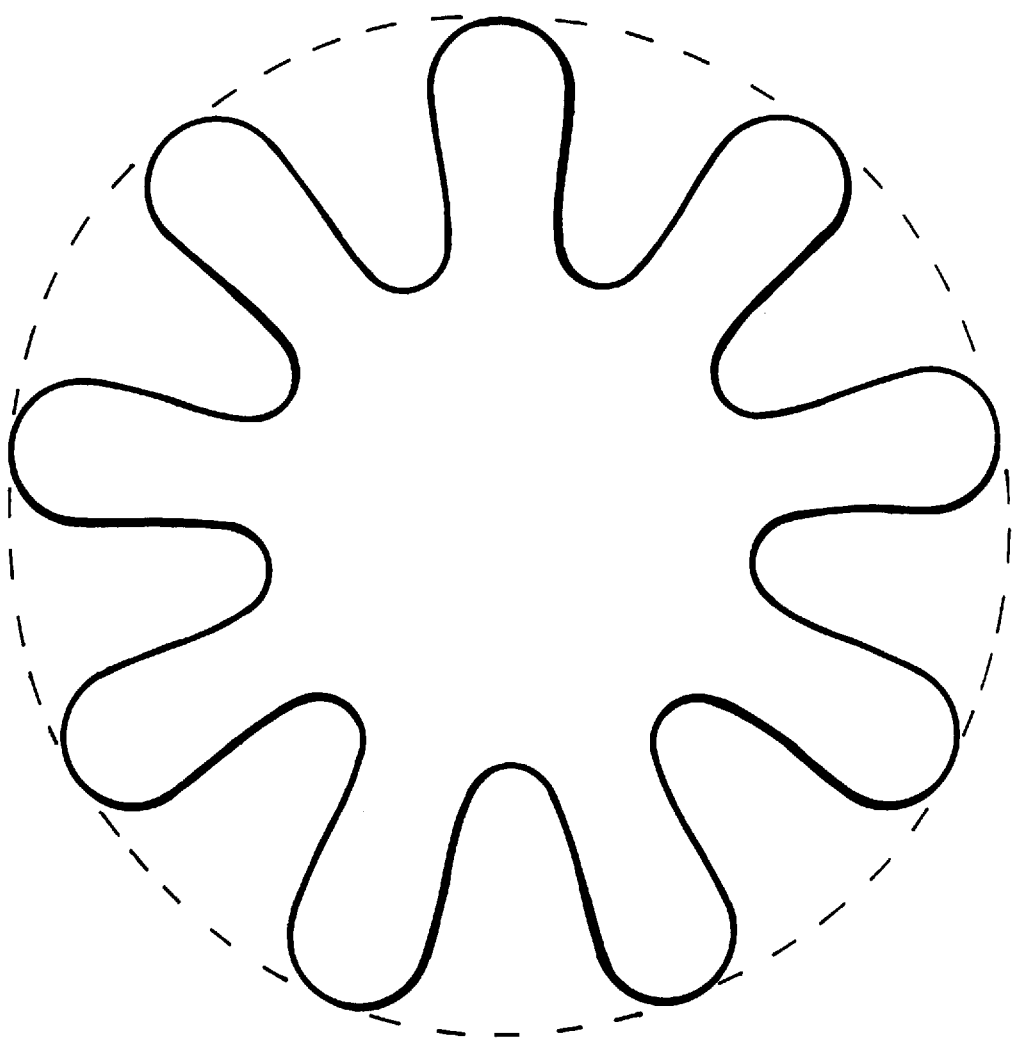

FIG. 1 shows a wavy shape in a flush plate, which also serves to reduce size.

I claim:

1. Virtual impactor for enriching aerosol particles contained in a gas, the virtual impactor comprising:

a curved, slit-shaped generator nozzle arranged in a closed loop around an axis of the impactor and producing, during operation, a gas jet containing the aerosol particles; and a matching slit-shaped receptor nozzle arranged in the direction of the jet and taking up a fraction of the gas jet, whereby particles in the gas jet that pass through the receptor nozzle move toward the impactor axis.

2. Virtual impactor as in claim 1, whereby the slits of the generator and receptor nozzles form closed figures and are lengthened by a wavy design.

3. Virtual impactor as in claim 1, whereby the slit-shaped nozzles are located in two plane-parallel plates.

4. Virtual impactor as in claim 1, whereby the slit-shaped nozzles are located on the surfaces of concentric cylinders, cone segments, sphere segments, or torus segments centered about the impactor axis.

5. Virtual impactor as in claim 4, whereby the slits of the generator and receptor nozzles form closed figures and are lengthened by a wavy design.

6. Virtual impactor as in claim 4, whereby the slit-shaped nozzles form circles, the axis of which coincides with the impactor axis.

* * * * *